June 3, 1941.　　　B. D. SMITH　　　2,244,027
TEAT DILATOR
Filed Oct. 31, 1938
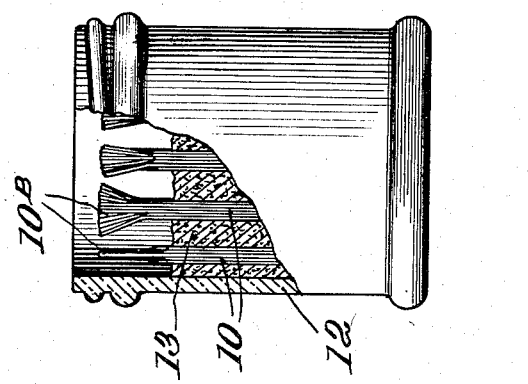
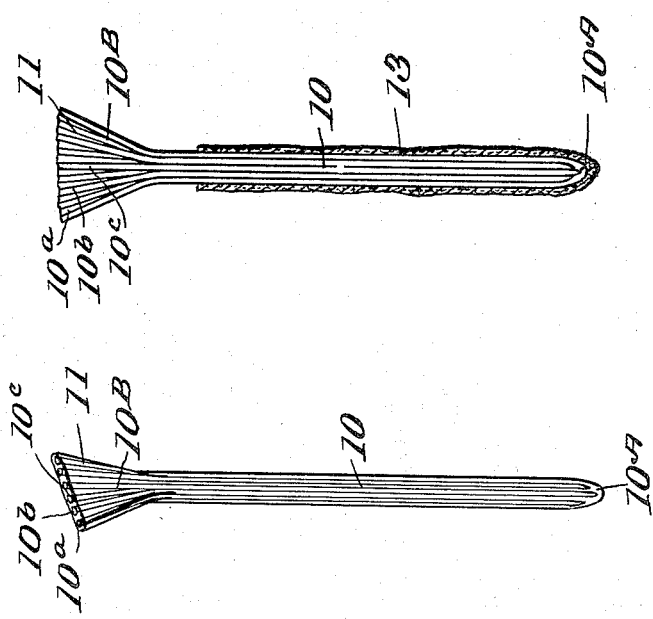
Inventor
B. D. Smith
By [signature]
His Attorney Patented June 3, 1941

2,244,027

UNITED STATES PATENT OFFICE 2,244,027

TEAT DILATOR

Benjamin D. Smith, Utica, N. Y.

Application October 31, 1938, Serial No. 237,987

1 Claim. (Cl. 128—341)

My invention relates to a medicated dilator for the teats of milch cows.

Among the objects of my invention are the provision of a simple, inexpensive and efficient means for reliably treating the teats of milch cows to relieve or prevent soreness and assure an ease of milking without pain or injury to the animal and with an unimpeded flow through the teat.

The invention accordingly consists in the combination of features and mixture of materials and ingredients, as described herein and set forth in the accompanying claim.

In the drawing illustrating certain features of my invention,

Figure 1 is a view of one of the dilators.

Figure 2 is a sectional view of a dilator with its medicated coating.

Figure 3 indicates a convenient form of packing for a number of dilators in the medicated ointment.

As conducive to a clearer understanding of certain aspects of my invention, it is to be noted at this point that a condition known as "spider and obstruction" frequently develops in the teats of a milch cow. This results in an obstruction which impedes or entirely prevents the extraction of milk. In the main, it appears that the mucous membrane lining the teat canal is affected. These conditions may result from a trauma or mastitis. In either case, the inflammation, which may be accompanied by a streptoccocic infection, has produced an irritation resulting in a stricture of the teat canal. This is sometimes painful and materially affects the process of milking.

Accordingly, one of the outstanding objects of my invention is the provision of means for effectively treating the teats of cows and supplying these treating means in a compact and accessible form permitting prompt and reliable treatment.

Referring now more particularly to the practice of my invention, attention is directed to the drawing wherein there is shown a dilator 10, convenienty comprising a number of absorbent elements 10a, 10b, 10c, etc., of flax, cotton, or other suitable absorbent material, stiffened with a medicated wax, glue or other similar substance 11. One end 10A is rounded while the other end 10B is flattened. The flat head is a part of the dilator itself and serves as a ready means for handling the dilator without risk of pulling off or breaking. A number of dilators are conveniently contained in a covered jar 12 containing an emollient medication 13. Maintenance of the dilators in the medicant assures a thorough penetration of medicant into the surface of the dilator. This is particularly important in subsequently treating the teat of a cow.

Preferably the medicant comprises a mixture of approximately 1¼ pounds of acetanilid, 1½ ounces of beta naphthol, 1½ pounds of balsam of fir and 2 ounces of oil of sassafras. The mixture of these ingredients is then dissolved in 5 pints of acetone. To this is added 2½ ounces iodoform and the whole is mixed with 100 pounds of melted petroleum jelly.

Simple calculation shows that the percentage relationships existing between the ingredients are approximately as follows:

|  | Per cent |
|---|---|
| Acetanilid | 1.2 |
| Beta naphthol | .1 |
| Balsam of fir | 1.4 |
| Oil of sassafras | .1 |
| Acetone | 3.7 |
| Iodoform | .2 |
| Petroleum jelly | Balance |

The dilator, stiffened by the chilled wax or glue, is inserted into the teat canal after milking. The rounded end 10A facilitates insertion, without danger of puncturing the teat. Ordinarily the dilator is permitted to remain in the teat until removed as an incident to the next milking.

After being inserted in the canal, the warmth and moisture soften the wax, glue or other substance. The emollient medicant is thus brought into immediate contact with the restricted tissue. Moreover, there is a gradual enlargement of the fibrous cotton, flax, or other cords, which tends to distend the teat canal. The advantages of this form of dilation and medication are that it places soothing and healing medicants in immediate contact with the congested and irritated areas of the teat canal, by means which readily lend themselves to the flection to which the cow's teats are subjected. One of the immediate effects to be gained by the use of this form of dilator and medication is that the substance of which it is composed, by reason of the absorption of moisture, is slowly and effectively expanded, thus stretching and dilating the teat canal and surrounding tissues, without danger of injury from the foreign substance inserted in the canal for that purpose.

Thus, it will be seen that there has been provided in my invention means in which the objects hereinbefore stated, together with many thoroughly practical results, are successfully achieved.

My combination of dilator and medicated ointment, as well as the ointment itself, is particularly suitable for treating and preventing disorders in the teats of cows.

As many possible embodiments may be made of my invention and as many changes may be made in the embodiment hereinbefore set forth, it will be understood that all matter described herein, or shown in the accompanying drawing, is to be interpreted as illustrative and not as a limitation.

Having now described my invention, what is claimed as new and useful is:

In manufactures of the class described, in combination, a plurality of teat dilators, each being pointed at one end and distended at the other, and having an absorbent core and wax coating giving a continuous surface uninterrupted by nitches or projections; and a container of emollient medicant in which said plurality of dilators are immersed to give a medicated coating on the dilators which is penetrated by the heat and moisture of the teat to soften the dilator while in use.

B. D. SMITH.